(12) United States Patent
Kosuda

(10) Patent No.: US 8,958,107 B2
(45) Date of Patent: Feb. 17, 2015

(54) IMAGE FORMATION DEVICE, IMAGE FORMATION SYSTEM AND IMAGE FORMATION METHOD

(71) Applicant: Oki Data Corporation, Tokyo (JP)

(72) Inventor: Shota Kosuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/205,714

(22) Filed: Mar. 12, 2014

(65) Prior Publication Data

US 2014/0268230 A1    Sep. 18, 2014

(30) Foreign Application Priority Data

Mar. 18, 2013  (JP) ................................ 2013-055558

(51) Int. Cl.
  *G06F 15/00*  (2006.01)
  *G06F 3/12*  (2006.01)
  *G06K 1/00*  (2006.01)
  *G06K 15/00*  (2006.01)

(52) U.S. Cl.
  CPC ............ *G06F 3/1263* (2013.01); *G06F 3/1292* (2013.01)
  USPC .......................................... 358/1.15; 358/1.14

(58) Field of Classification Search
  CPC ............................. G06F 3/1263; G06F 3/1292
  USPC .................................. 358/1.15, 1.14, 1.13, 1.1
  See application file for complete search history.

(56) References Cited

U.S. PATENT DOCUMENTS

| | | | | |
|---|---|---|---|---|
| 2012/0050812 | A1* | 3/2012 | Takahashi | 358/1.16 |
| 2013/0114103 | A1* | 5/2013 | Oishi et al. | 358/1.15 |

FOREIGN PATENT DOCUMENTS

JP        2003-256339 A      9/2003

* cited by examiner

*Primary Examiner* — Douglas Tran
(74) *Attorney, Agent, or Firm* — Marvin A. Motsenbocker; Mots Law, PLLC

(57) ABSTRACT

An image formation device includes a communication unit configured to receive image data from an external device connected to the image formation device through a network, a control unit configured to set a priority order for the image data received from the external device by the communication unit, a print unit configured to print the image data from the external device and image data requested to be printed from within a local area of the image formation device, based on the priority order, and a timer unit configured to be activated when the priority order is set and detect an elapse of a set time. The control unit lowers the priority order after the elapse of the set time detected by the timer unit.

13 Claims, 14 Drawing Sheets

FIG.6

| PRINTER ID | CLOUD PRINT SERVICE ACCOUNT | PRIORITY |
|---|---|---|
| 001 | mobile300@cloudprint.com | HIGH |
| 002 | mobile300@cloudprint.com | LOW |
| : | : | : |

IMAGE FORMATION DEVICE, IMAGE FORMATION SYSTEM AND IMAGE FORMATION METHOD

CROSS REFERENCE TO RELATED APPLICATIONS

This application claims priority based on 35 USC 119 from prior Japanese Patent Application No. 2013-055558 filed on Mar. 18, 2013, entitled "IMAGE FORMATION DEVICE, IMAGE FORMATION SYSTEM AND IMAGE FORMATION METHOD", the entire contents of which are incorporated herein by reference.

BACKGROUND OF THE INVENTION

1. Field of the Invention

This disclosure relates to an image formation device, an image formation system and an image formation method with a function to print received print data.

2. Description of Related Art

There has been generally known a system for printing by transmitting print data using a communication network such as the Internet. Such a system includes a function (hereinafter referred to as "InternetFAX") to receive an e-mail with an attached image file from a mail server and print the attached file and a function (hereinafter referred to as "cloud print") to perform printing by receiving print data from a server on the Internet through a service called cloud on the Internet.

A person who wishes to perform printing can use the functions described above to similarly perform printing whether he/she is near or far away from an image formation device. Japanese Patent Application Publication No. 2003-256339 describes an example of such a system.

SUMMARY OF THE INVENTION

An object of an embodiment of the invention is to improve the convenience of an image formation apparatus upon receiving plural printing requests.

One aspect of the invention is a image formation device that includes: a communication unit configured to receive image data from an external device connected to the image formation device through a network; a control unit configured to set a priority order for the image data received from the external device by the communication unit; a print unit configured to print the image data from the external device and image data requested to be printed from within a local area of the image formation device, based on the priority order; and a timer unit configured to be activated when the priority order is set and detect an elapse of a set time. The control unit lowers the priority order after the elapse of the set time detected by the timer unit.

According to the above aspect of the invention, the convenience of an image formation apparatus upon receiving plural printing requests can be improved.

BRIEF DESCRIPTION OF THE DRAWINGS

FIG. 6 is a diagram illustrating an example of user setting information for a cloud print.

DETAILED DESCRIPTION OF EMBODIMENTS

Figure 1:
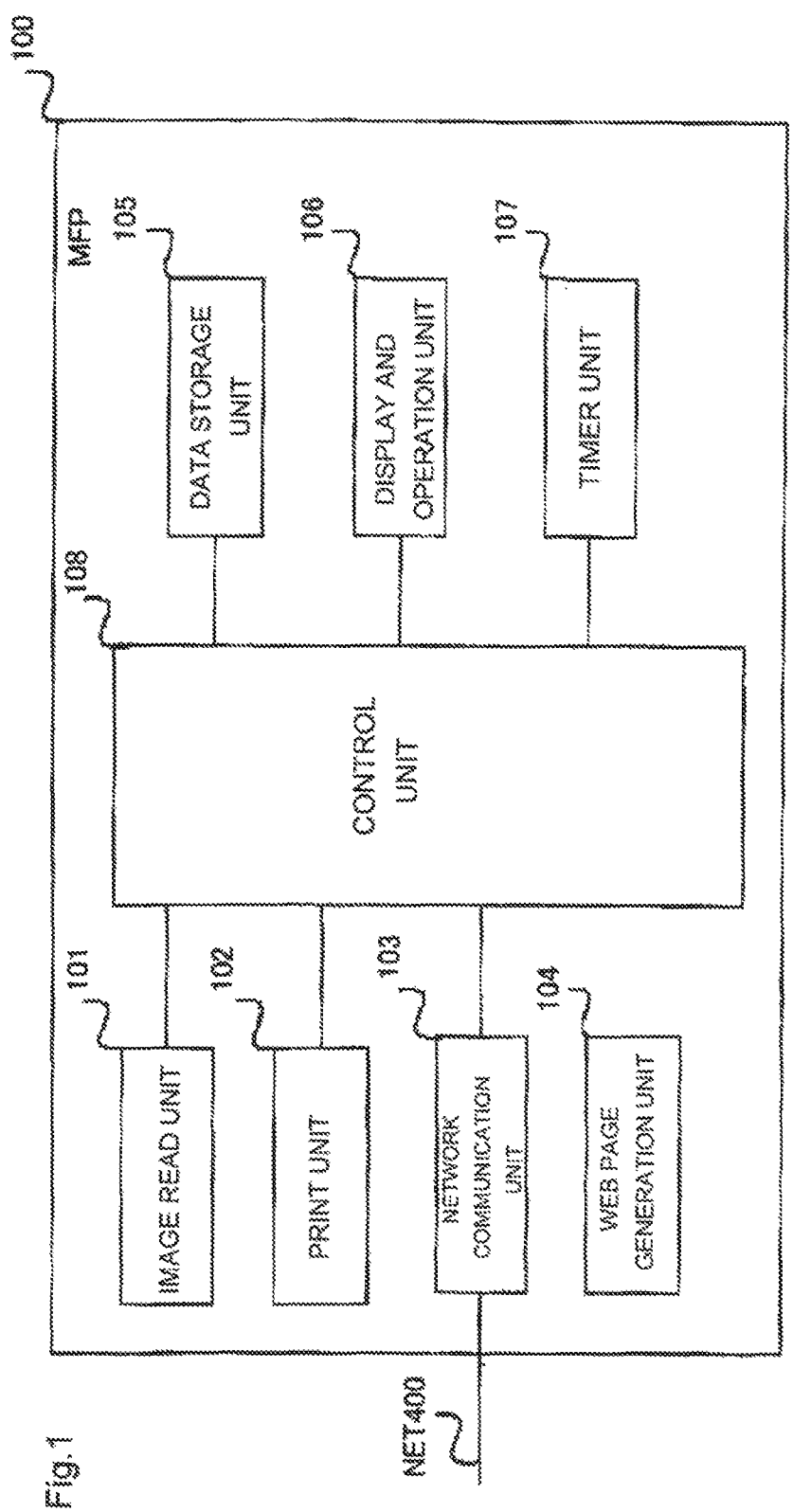
FIG. 1 is a block diagram illustrating a configuration of a multi-function printer (MFP) as an image formation device according to a first embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Embodiments of the invention are described below. According to the embodiments of the invention, a terminal of a user is registered with a cloud using a panel, a Web page or the like of a device that can only be used within an area near an installation location of this device (MFP 100), so that printing can be performed by raising the priority order. Then, after the elapse of a certain period of time, the priority order is lowered by deleting from the cloud the settings of the terminal registered with the cloud. The invention is described in detail below.

First Embodiment

First, a description is given of an image formation device and an image formation system according to a first embodiment.

FIG. 1 illustrates a configuration of MFP 100 as an image formation device used in the description of this embodiment. MFP 100 includes image read unit 101, print unit 102, network communication unit 103, Web page generation unit 104, data storage unit 105, display and operation unit 106, timer unit 107 and control unit 108 connected to those units.

Image read unit 101 reads a set document, and is a scanner mounted on MFP 100, for example.

Print unit 102 prints image data from an external device such as a cloud and image data requested to be printed from within a local area of this device, on the basis of a priority order to be described later. Here, print requests within the local area include a print-involving instruction (such as copy) inputted using an input unit such as an operation unit in this device, a print-involving instruction transmitted from a device connected to a LAN (local area network) to which this device is connected, and the like.

Print unit 102 interprets print data described in a page-description language, and performs printing using a toner. The print data is data in a PostScript format, for example. Also, some image formation devices have a function to interpret data in a PDF (Portable Document Format) format and directly print the data. MFP 100 of this embodiment also has a function to print print data in the PDF format.

Network communication unit 103 is connected to an external device such as a cloud through a network and is capable of receiving image data from the external device. Network communication unit 103 transmits and receives data using respective protocols through connection with NET 400. Network communication unit 103 performs processing as an HTTP (HyperText Transfer Protocol) server when displaying a Web page included in the device, for example, and also performs processing as an HTTP client when connected from the device to an HTTP server outside the device. Furthermore, network communication unit 103 is connected to a cloud (hereinafter called a cloud print service) which provides a cloud print function on the Internet, and performs processing as an XMPP (Extensible Messaging and Presence Protocol) client in order to have an event related to cloud print notified of from the cloud.

When requested to acquire a Web page of the device by a PC outside the device through the network communication unit 103, for example, Web page generation unit 104 generates data in a format that is used for Web pages, such as HTML (HyperText Markup Language), and then converts the generated data into data in a data format that can be sent back to the PC. Also, the Web pages of MFP 100 include a Web page that can also be browsed and used by a general user (hereinafter referred to as the "user Web page") and a Web page that can only be browsed and used by an administrator (hereinafter referred to as the "administrator Web page"). Note that a password for the administrator (hereinafter referred to as the administrator password) is required to browse the administrator Web page. The administrator Web page is made accessible only when the password is correct.

Data storage unit 105 stores data such as set values of the device, for example, in the device, and also controls any change, deletion or the like of those values.

Display and operation unit 106 displays information on a status and menus of the device, provides the user with the device status, and receives an operation request from the user to change the setting of the device, to execute functions, and the like. Note that, as in the case of the Web pages of the device described above, the menus of the device include a menu that is also displayed to a general user and can be set and executed by the general user (hereinafter referred to as the "user menu") and a menu that is displayed only to an administrator and can only be set and executed by the administrator (hereinafter referred to as the "administrator menu"). Note that, as in the case of the Web pages of the device, the administrator password preset in the data storage unit 105 is required to display the administrator menu.

Timer unit 107 is activated when a priority order (to be described later) is set by control unit 108 and detects an elapse of a set time. Timer unit 107 uses a timer provided in the device to detect lapses of various times for different purposes. Also, timer unit 107 has a function to give notification of an expiration after the elapse of a time-out period, when a priority setting of cloud print is "ON".

Control unit 108 sets a priority order for the image data received from the external device, such as the cloud, by network communication unit 103. Control unit 108 controls the respective units described above from image read unit 101 to timer unit 107, which are connected to control unit 108, respectively. Also, control unit 108 performs processing for lowering the priority order in response to the elapse of the set time detected by timer unit 107. Moreover, control unit 108 is connected, through network communication unit 103, to a registration unit in the external device such as the cloud. The registration unit can register a "high-speed printer" that is a first user setting as a high priority setting and a "low-speed printer" that is a second user setting as a low priority setting. Control unit 108 has a function to lower the priority order by deleting the first user setting from the registration unit in the external device in response to the lapse of the set time. To be more specific, control unit 108 stores processing functions to be described later.

Figure 2:
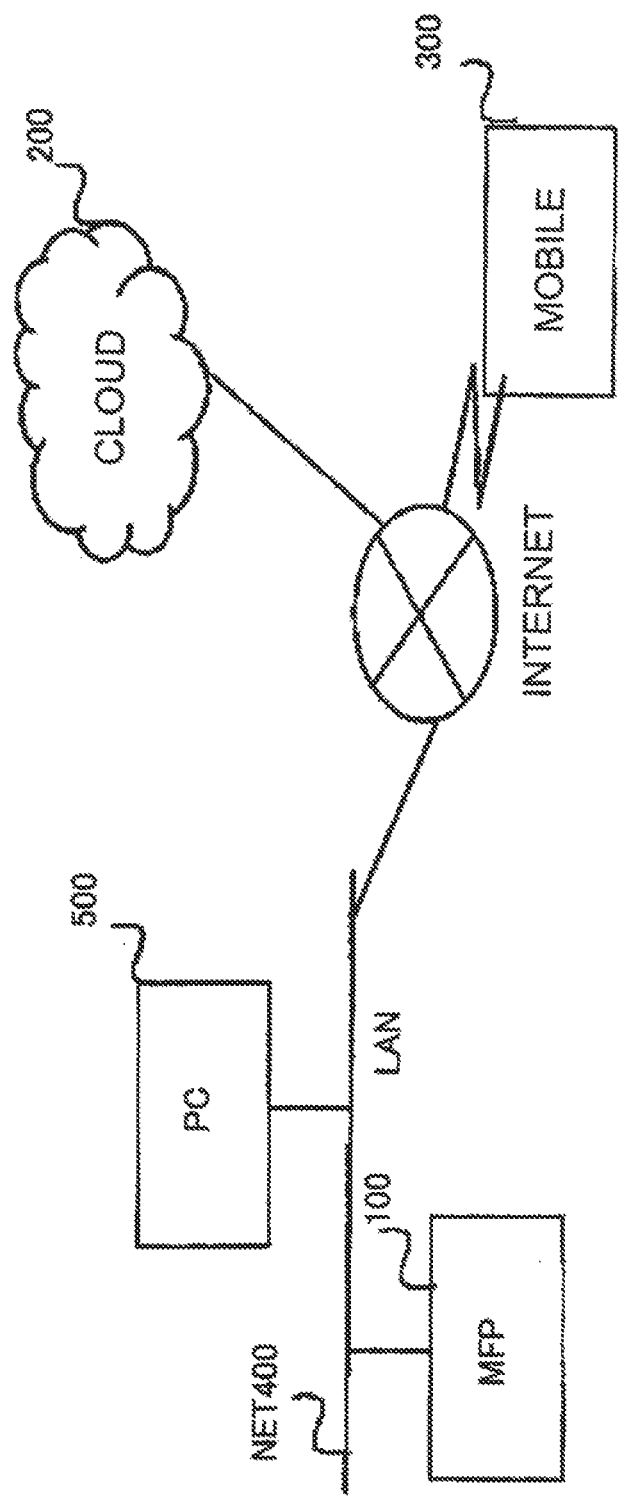
FIG. 2 is a network configuration diagram illustrating an example of network connections between respective devices in the first embodiment of the invention.

FIG. 2 is a network configuration diagram illustrating an example of network connections between respective devices included in the image formation system according to this embodiment. MFP 100 is network-connected to NET 400 that is a LAN (Local Area Network). NET 400 is connected to the Internet. MFP 100, cloud 200 and mobile 300 are connected to each other through the Internet, and can communicate with each other using TCP/IP. MFP 100 and PC 500 are connected to each other through NET 400, and can communicate with each other using TCP/IP. Cloud 200 as the external device is a cloud print service providing a cloud print function. Cloud 200 has the functions of an HTTP server and an XMPP server.

Figure 3:
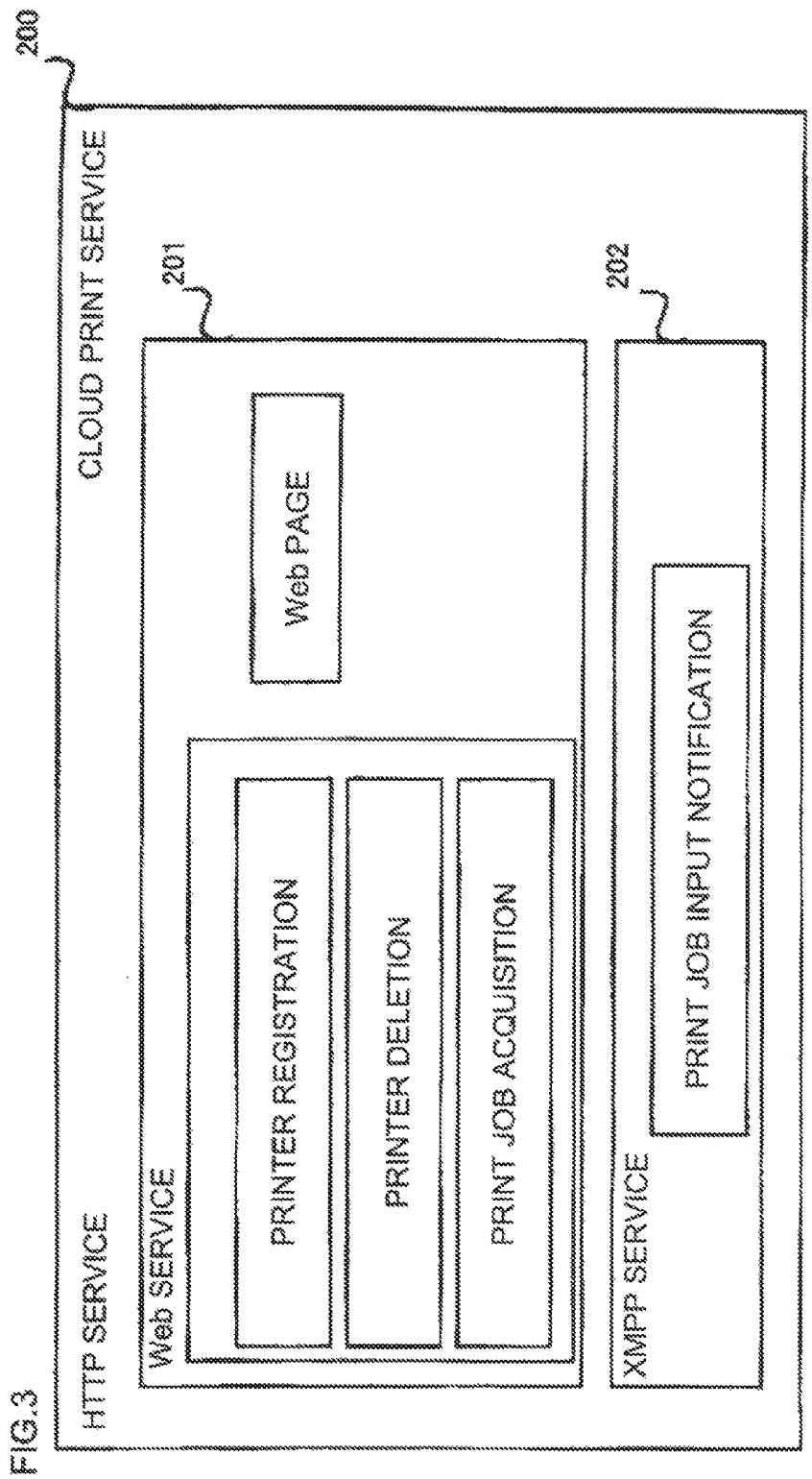
FIG. 3 is a functional block diagram illustrating main functions of a cloud in the first embodiment of the invention.

FIG. 3 is a functional block diagram illustrating main functions of cloud 200. HTTP service 201 serves the function of the HTTP server. More specifically, HTTP service 201 receives a request from an HTTP client to acquire a Web page held by the cloud, and transmits the Web page to the HTTP client. This HTTP service 201 is a so-called Web service, which provides the HTTP client with a service of a cloud print function that can be used using HTTP. In the example of FIG. 3, HTTP service 201 includes "printer registration", "printer deletion" and "print job acquisition" as the services of the cloud print function that can be used using HTTP, for example. Here, "printer registration" is a service used by the image formation device such as MFP 100, for example. More specifically, "printer registration" is a service to establish a user setting to connect the image formation device to a user who wishes to use the cloud print function, and to register the user setting in the cloud print service. "Printer deletion" is a service to delete the user setting in the cloud print service, which is registered by "printer registration" described above. "Print job acquisition" is a service for the image formation device such as MFP 100, for example, to acquire print data inputted to the cloud print service by a user who wishes to print using cloud print. XMPP service 202 serves the function of the XMPP server. XMPP service 202 notifies an XMPP client of an event related to cloud print on the cloud, as a service for the cloud print function. In the example of FIG. 3, XMPP service 202 includes "print job input notification" as an example of the event related to cloud print, which the XMPP client is notified of using XMPP. Here, "print job input notification" is a service, when print data is inputted to the cloud print service by the user, to notify the appropriate image formation device of the input of the print data to the cloud print service.

Mobile 300 is a mobile terminal such as a smartphone capable of browsing Web pages on the Internet. A Web browser with an HTTP client function is installed in mobile 300. This Web browser in mobile 300 enables browsing of the Web pages on the Internet.

PC 500 is a terminal device such as a personal computer capable of browsing the Web pages of MFP 100 and the like. As in the case of mobile 300 described above, a Web browser with an HTTP client function is installed in PC 500. This Web browser in PC 500 enables browsing of the Web pages of MFP 100 and the like.

In the above description, mobile 300 is directly connected to the Internet. However, mobile 300 may be connected to the Internet through NET 400. More specifically, another network configuration may be adopted such that mobile 300 is connected to the Internet through NET 400, as in the case of PC 500, using a wireless LAN.

Next, a description is given of an image formation method using the network configuration described above.

In this embodiment, operations of the system are described taking, as an example, a case where MFP 100 performs "printer registration" with cloud 200 in order to allow MFP 100 to perform cloud print by an operation from mobile 300. The cloud print function of cloud 200 allows MFP 100 to perform printing in response to an operation from mobile 300, and then a certain period of time passes. To be more specific, an example is given of a user who has a mobile 300 and comes on a business trip to a business office where MFP 100 is installed. The following description is given assuming a case where the user performs printing from mobile 300 after registering his/her user setting of MFP 100 with cloud 200 so that he/she can use mobile 300 to perform printing with MFP 100, and then returns to his/her own office from the business trip.

Figure 4:
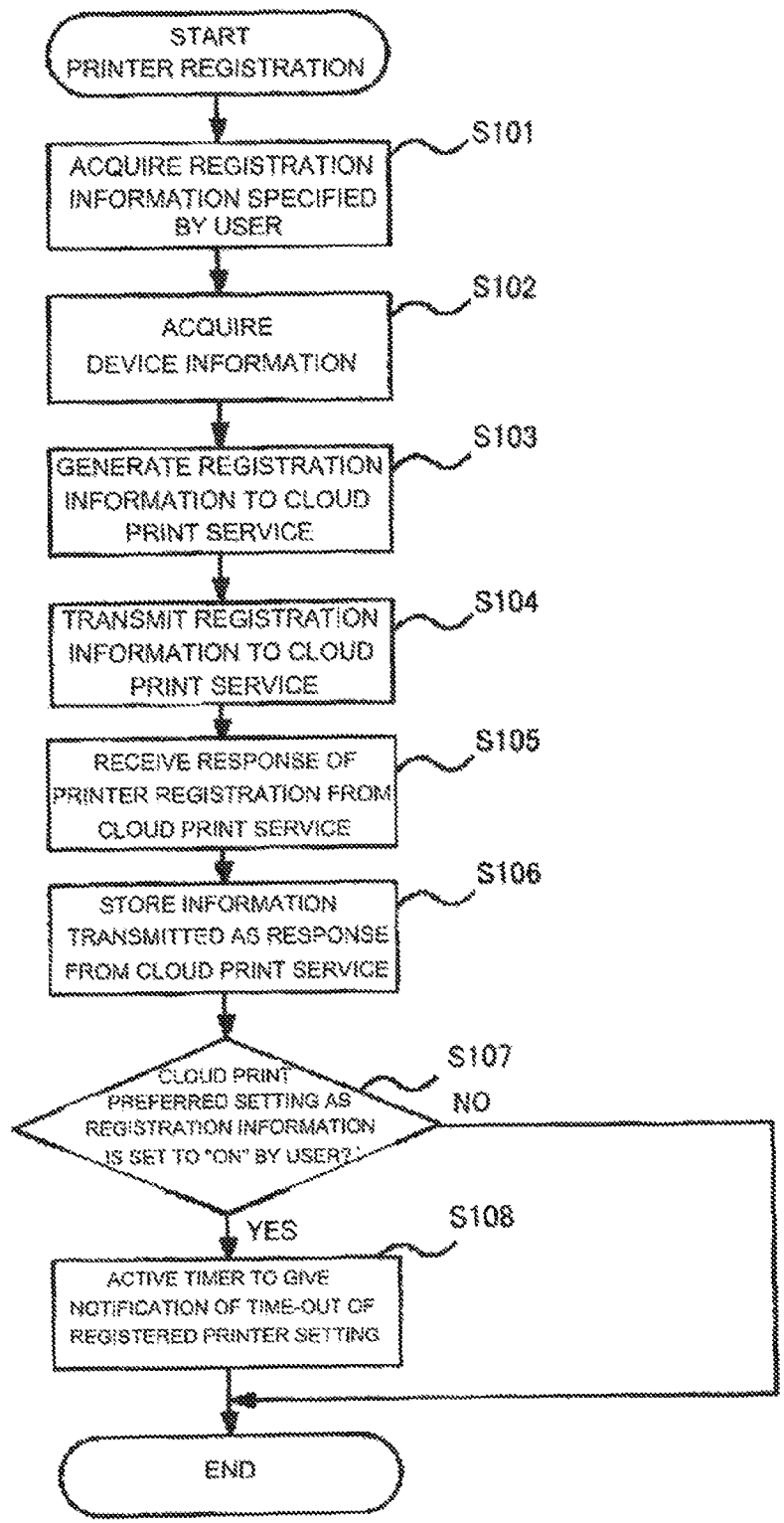
FIG. 4 is a flowchart illustrating an operation of the MFP performing "printer registration" with the cloud in the first embodiment of the invention.
Figure 10:
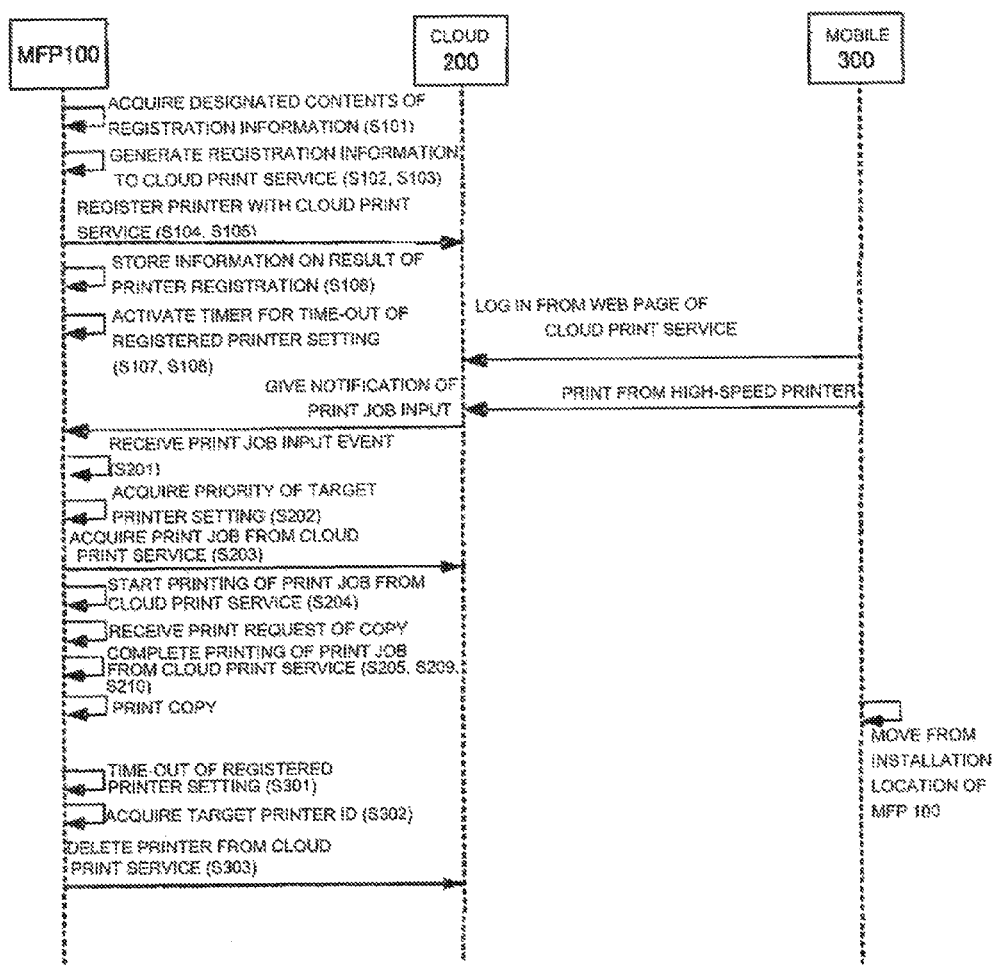
FIG. 10 is a diagram illustrating a message flow between the devices when a high-speed printer is registered and designated to perform printing by the MFP according to the first embodiment of the invention.
Figure 11:
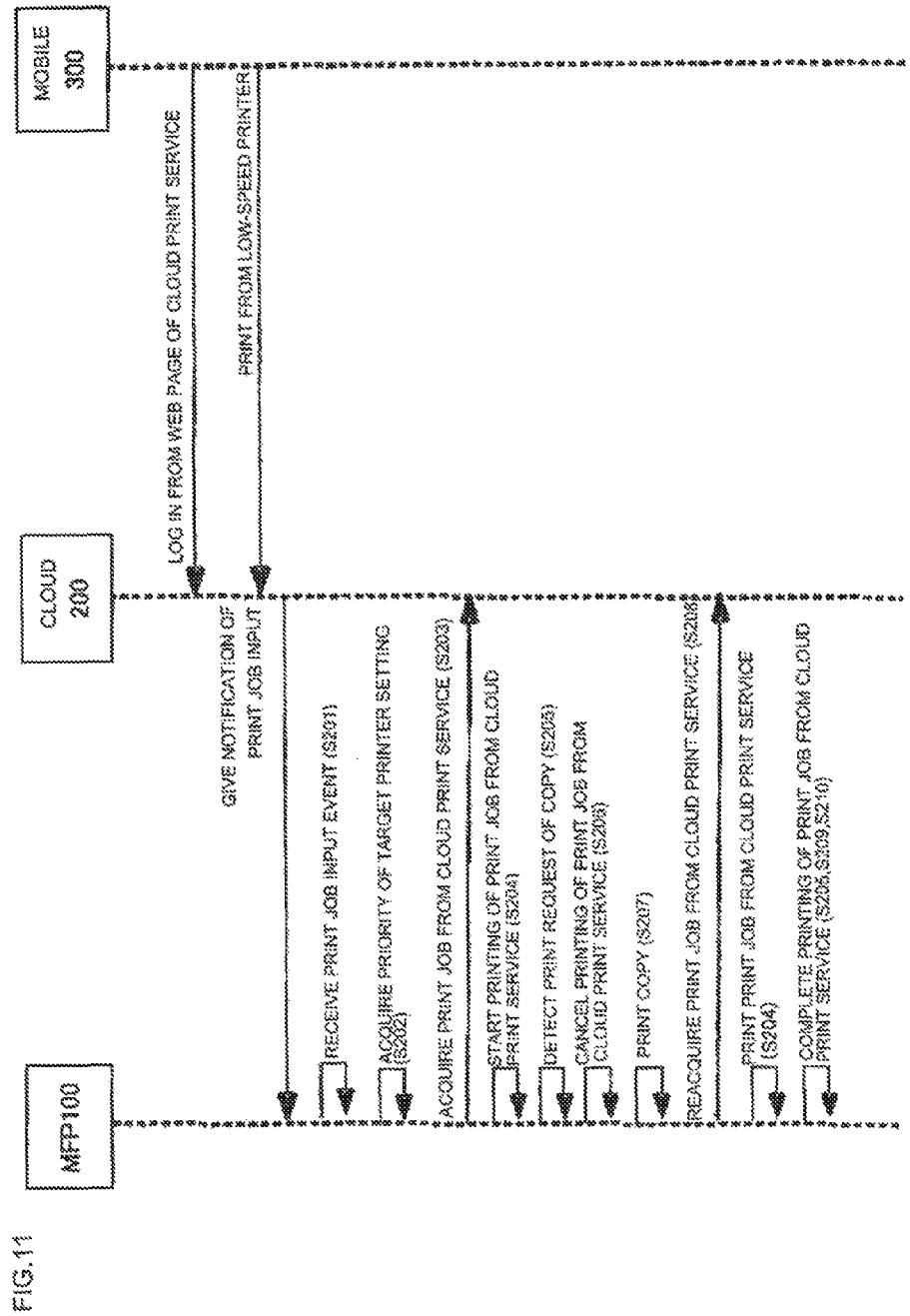
FIG. 11 is a diagram illustrating a message flow between the devices when a low-speed printer is designated to perform printing by the MFP according to the first embodiment of the invention.

First, a description is given of an operation when MFP 100 performs "printer registration" with cloud 200 to register the user's user setting of MFP 100 with cloud 200. FIG. 4 illustrates an operation flow of MFP 100 performing "printer registration" with cloud 200. FIGS. 10 and 11 illustrate a flow of messages between the respective devices in this embodiment, including the operation of "printer registration".

Figure 5:
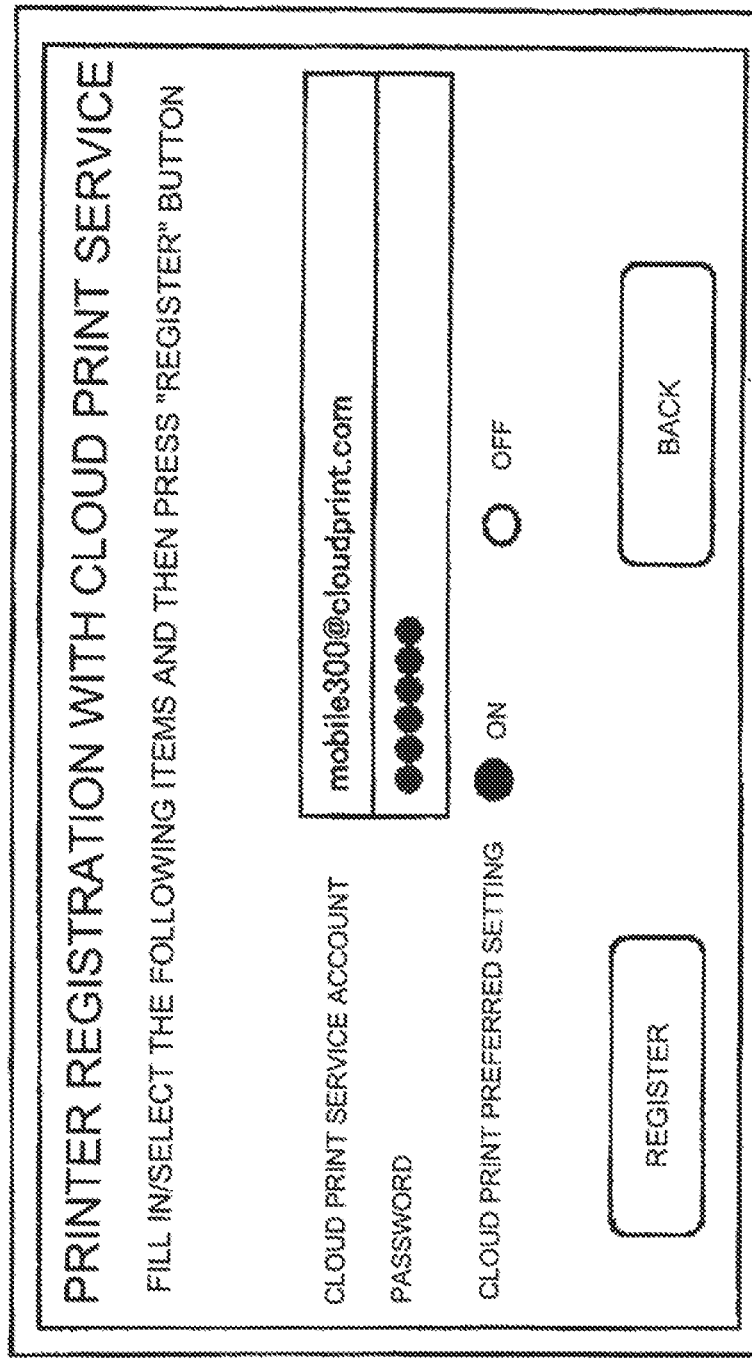
FIG. 5 is a diagram illustrating a screen example of a display and operation unit when the MFP performs printer registration.

The user on a business trip enters necessary information from a user menu as illustrated in FIG. 5, which is the user menu displayed by display and operation unit 106 in MFP 100. To be more specific, the user specifies an account "mobile300@cloudprint.com" for the cloud print service in cloud 200 and a password for the account, selects "ON" in cloud print preferred setting, and then enters information required to register user settings to cloud 200. Then, the user registers by pressing the "Register" button.

Control unit 108 acquires the registration information entered by the user through display and operation unit 106 (S101). Here, the cloud print preferred setting is the setting of a device specified by the user in order for MFP 100 to determine the priority, that is the print priority order, of cloud print in association with the user settings registered with the cloud print service. This setting is sequentially described in more detail based on the following operations. Note that the user acquires the account "mobile300@cloudprint.com" beforehand for the cloud print service through a Web page of cloud 200, and the password for the account is already set in cloud 200.

Control unit 108 acquires information stored in the device, e.g., printing capacity information on MFP 100 through data storage unit 105, such as whether or not color designation is possible, a paper size that can be designated, a paper feed tray that can be designated and whether or not both-side printing is possible (S102).

Furthermore, control unit 108 generates registration information for the cloud print service, including a printer name and the like, for example, based on the information acquired from data storage unit 105 (S103). Note that here, when the cloud print preferred setting that is the user input information acquired by display and operation unit 106 is "ON", control unit 108 generates two kinds of registration information: registration information for the cloud print service on "high-speed printer" as the printer name, which is set to have a high print priority order for a print job to be inputted and registration information for the cloud print service on the "low-speed printer" which is set to have a low print priority order for a print job to be inputted. On the other hand, when the cloud print preferred setting is "OFF", control unit 108 generates only registration information for the cloud print service on the "low-speed printer" as the printer name.

In this embodiment, since the user sets the cloud print preferred setting to "ON", two kinds of registration information for the cloud print service are generated, including "high-speed printer" and "low-speed printer" as the printer name. Under the control of control unit 108, network communication unit 103 communicates with cloud 200 using HTTP through NET 400 and the Internet. By this communication, the user settings are registered in association with "mobile300@cloudprint.com" using the "printer registration" service in cloud 200 for each of the generated registration information for the cloud print service (S104). Here, the two kinds of registration information for the cloud print service are registered, respectively, including "high-speed printer" and "low-speed printer" as the printer name.

Thereafter, upon receipt of the result of the "printer registration" from cloud 200, network communication unit 103 acquires a "printer ID" to identify the registered user settings, for each of the registered user settings (S105). Here, for each of the user settings of "high-speed printer" and "low-speed printer" as the printer name, "001" or "002" is designated as the "printer ID" and returned by cloud 200.

As illustrated in FIG. 6, data storage unit 105 stores in the device the "printer ID" received from cloud 200 by network communication unit 103 and the user's account for the cloud print service acquired by display and operation unit 106. In addition, the priority is set to "high" for "high-speed printer" and "low" for "low-speed printer", and is also stored in the device (S106).

Control unit 108 determines whether or not the cloud print preferred setting acquired by display and operation unit 106 is set to "ON" (S107). When the cloud print preferred setting is "OFF", the processing is terminated. When the cloud print preferred setting is "ON", the timer in timer unit 107 to give notification of an expiration after the elapse of a certain time-out period, is activated in order to detect the expiration of the user setting with the printer name "high-speed printer" (S108). In this embodiment, the time-out period is 24 hours. Note that, in the above description, the user performs the user setting registration with cloud 200 from the user menu displayed by display and operation unit 106 in MFP 100. However, the user may perform the registration in other ways. For example, the user may acquire a user Web page equivalent to the user menu, as illustrated in FIG. 5, generated by Web page generation unit 104 through network communication unit 103 in MFP 100. The user Web page equivalent is acquired from a Web browser of PC 500 capable of communicating with MFP 100 using HTTP, and may perform the user setting registration with cloud 200.

Next, a description is given of an operation when the user on a business trip performs printing from mobile 300 through cloud 200 using MFP 100 subjected to the user setting registration with cloud 200 as described above. Note that, in this embodiment, it is assumed that the duration of the business trip of the user is within 24 hours and the expiration of the user setting with the printer name "high-speed printer" described above does not occur during the business trip.

Figure 7:
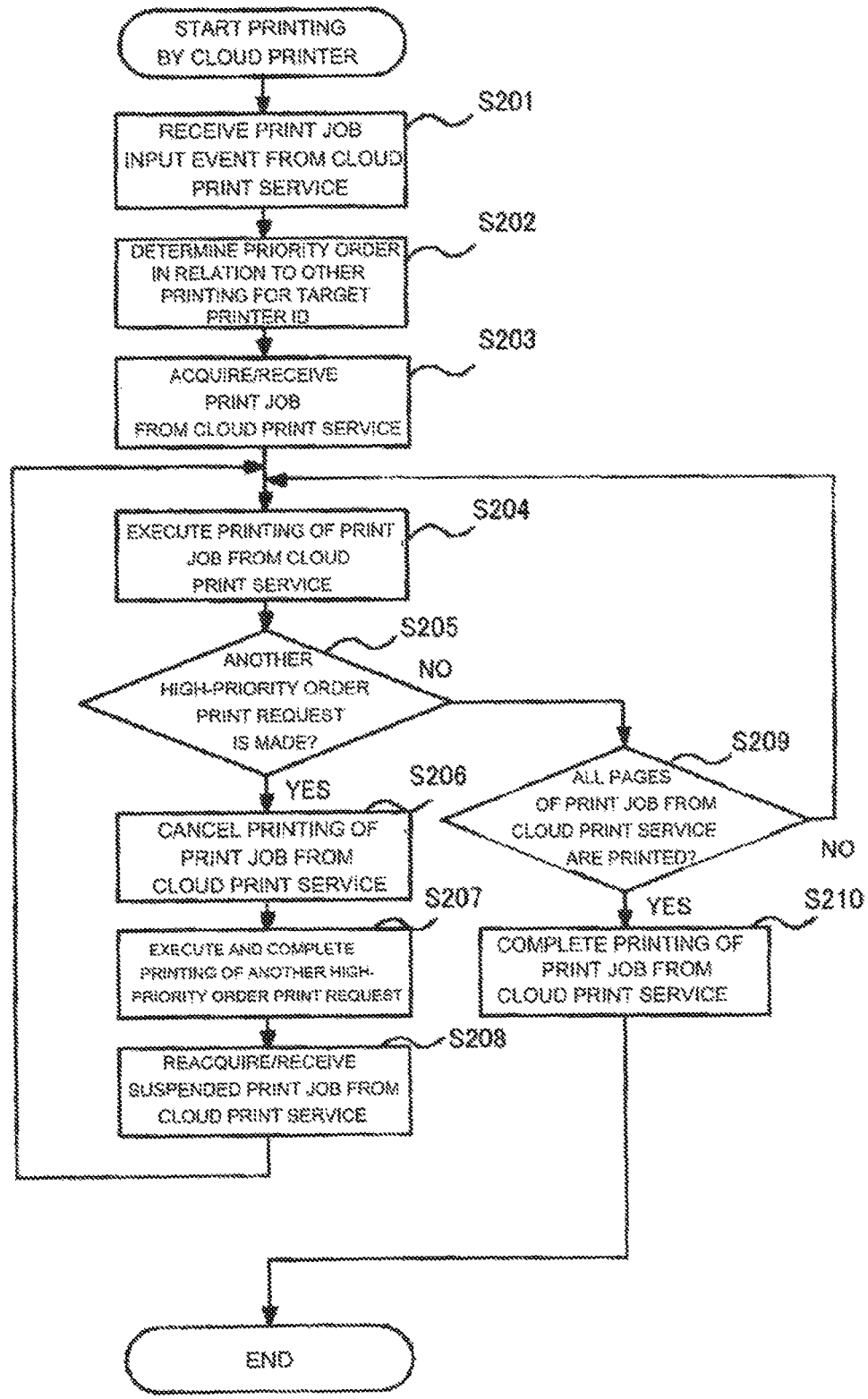
FIG. 7 is a flowchart illustrating processing conducted by the MFP when performing cloud print according to the first embodiment of the invention.
Figure 8:
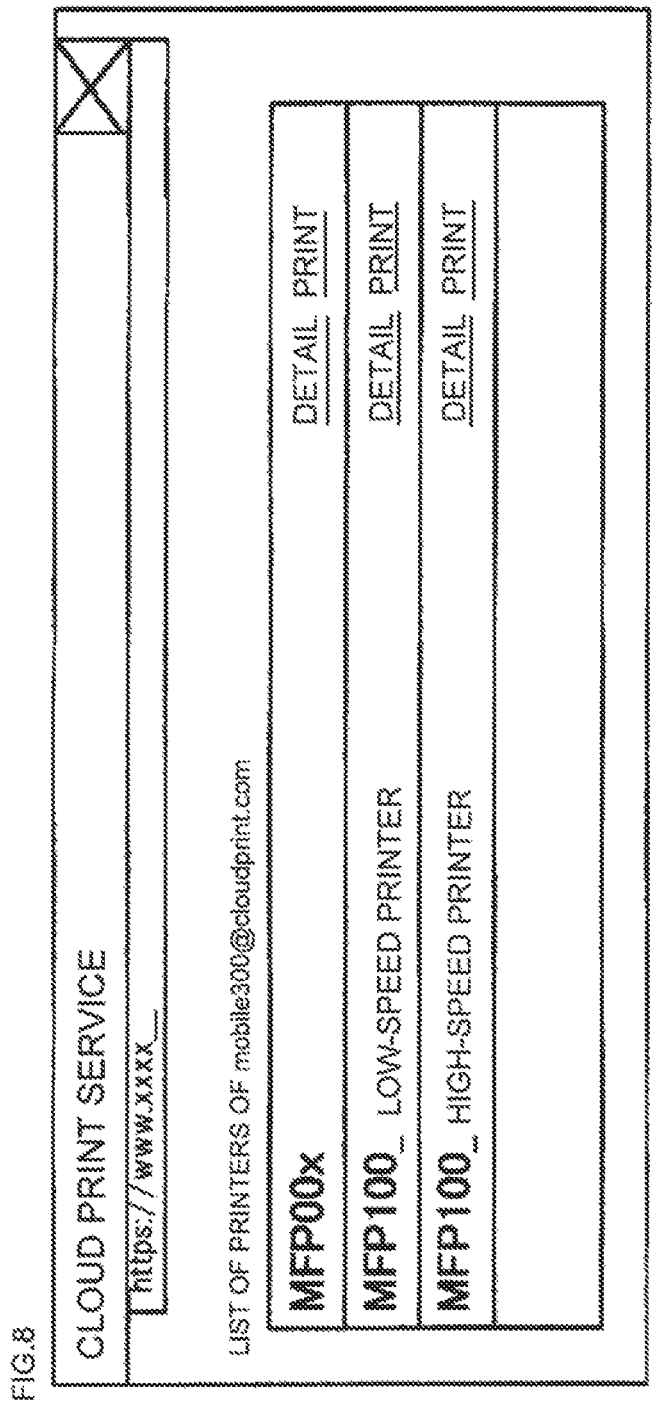
FIG. 8 is a diagram illustrating a screen example of a Web page about a list of printers in the cloud according to the first embodiment of the invention.

FIG. 7 is a flowchart illustrating the processing of MFP 100 in acquiring print data from cloud 200 and performing cloud print. FIG. 8 is a diagram illustrating a screen example of a Web page about a list of printers, such as usable or available printers, in cloud 200.

The user uses mobile 300 to log in from the Web page of cloud 200 by entering the account and password for the cloud print service. Then, the Web page of cloud 200 is displayed as illustrated in FIG. 8. On the Web page of cloud 200, printers having the printer names "high-speed printer" and "low-speed printer" are registered as the user settings of MFP 100 which has performed "printer registration" as described above. The user selects the "high-speed printer" and requests printing of a PDF file stored in mobile 300.

As illustrated in FIG. 7, network communication unit 103 in MFP 100 uses XMPP to receive "print job input notification" from cloud 200 (S201). This "print job input notification" gives notification of the fact that the "printer ID" is "001", identification information on a print job, and the like. Control unit 108 determines the priority by acquiring the user setting information for cloud print in MFP 100 illustrated in FIG. 6 through data storage unit 105. Since the "printer ID" received by network communication unit 103 is "001", control unit 108 determines the priority to be "high".

Next, a priority order is determined for the target printer ID in relation to other printing (S202). Here, since the priority is "high", it is determined to perform printing by raising the priority order in printing.

Network communication unit 103 communicates with cloud 200 using HTTP, transmits the "printer ID" and the identification information on the print job using the "print job acquisition" service on cloud 200, and also receives a file in a PDF format corresponding to the print data transmitted to cloud 200 by mobile 300 (S203).

Print unit 102 acquires the PDF file received by network communication unit 103 and executes the printing (S204). Note that another user may request display and operation unit 106 to execute a copy during the printing by cloud print.

Control unit 108 determines whether or not another high-priority order print request is made (S205). More specifically, when a request for execution of a copy or the like is made, control unit 108 detects the request and determines the priority orders of that printing and the printing in execution. Here, as described above, the priority of the printing in execution, i.e., the priority of the user setting information illustrated in FIG. 6 is "high". Thus, control unit 108 controls the printing to be performed by raising the priority order thereof. Accordingly, the printing by cloud print requested by mobile 300 is continuously performed. To be more specific, control unit 108 determines whether or not all the pages of the print job from the cloud print service are printed (S209), and repeats the processing of S204, S205 and S209 until all the pages are printed. Then, when the printing of all the pages is finished, the printing of the print job from the cloud print service is completed and then the copy is executed (S210).

Meanwhile, when it is determined in S205 that another high-priority order print request is made, the printing of the print job from the cloud print service is cancelled (S206) and printing of another high-priority order print request is executed and completed (S207). Thereafter, the suspended print job from the cloud print service is reacquired and received (S208), and then the processing of S204 is performed. Note that, here, the processing from S206 to S208 is not performed since the priority of the printing in execution is "high". However, the processing from S206 to S208 is performed in the following case.

Figure 9:
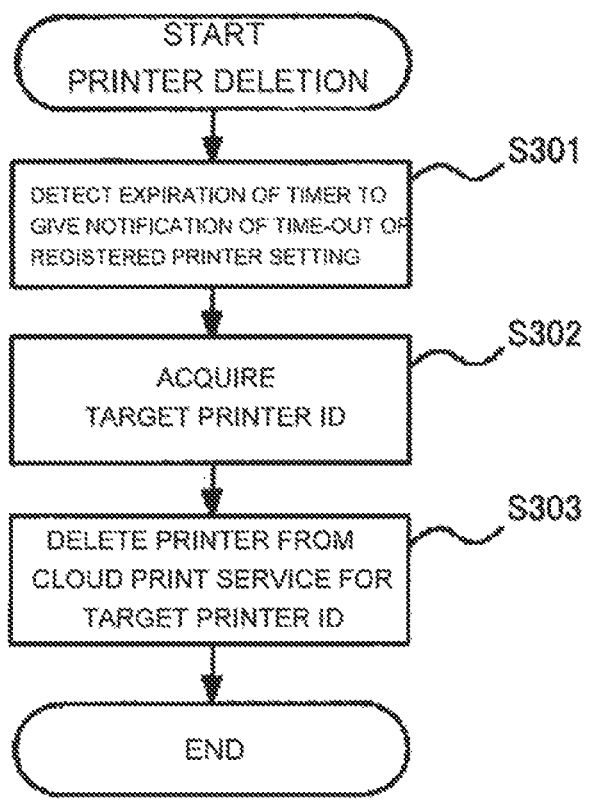
FIG. 9 is a flowchart illustrating processing performed by the MFP when deleting the user setting in the cloud according to the first embodiment of the invention.

Next, a description is given of an operation when the user returns to his/her own office from the business trip and 24 hours has passed since the user setting registration with cloud 200 by the user. In this case, the user setting of "high-speed printer" as the printer name is expired after 24 hours have passed since the registration. Thus, MFP 100 deletes the user setting of "high-speed printer" from cloud 200. This deletion operation is described with reference to FIG. 9. FIG. 9 is a flowchart illustrating the processing of MFP 100 when deleting the user setting with "001" as the "printer ID", which is the user setting to cloud 200.

Control unit 108 in MFP 100 detects, through timer unit 107, the expiration of the timer activated upon execution of the "printer registration" with cloud 200 (S301), and acquires "001" through data storage unit 105, which is the "printer ID" in the expired user setting (S302). Next, network communication unit 103 communicates with cloud 200 using HTTP under the control of control unit 108, designates "001" as the "printer ID" using the "printer deletion" service in cloud 200, and deletes the user setting of "high-speed printer" as the printer name in MFP 100 from cloud 200 (S303). Thereafter, through data storage unit 105, the entry of "001" as the "printer ID" is also deleted from the user setting information for cloud print in MFP 100 as illustrated in FIG. 6.

Next, with reference to FIG. 7, a description is given of an operation when, after the business trip described above, the user goes on a business trip again to the business office where MFP 100 is installed, and performs printing using MFP 100 from mobile 300 through cloud 200 while traveling to the business office where MFP 100 is installed.

The user uses mobile 300 to log in from the Web page of cloud 200 by entering the account and password for the cloud print service and to have the Web page of cloud 200 displayed. In this event, on the Web page of cloud 200, the user setting of "high-speed printer" as the printer name in MFP 100 is already deleted from cloud 200. Therefore, the Web page is displayed in a state where the printer having the printer name "high-speed printer" in MFP 100 is deleted from the Web page illustrated in FIG. 8. The user selects the "low-speed printer" and requests printing of a PDF file stored in mobile 300. Network communication unit 103 in MFP 100 receives "print job input notification" from cloud 200 using XMPP. The "print job input notification" gives notification of the fact that the "printer ID" is "002", identification information on a print job, and the like (S201). Control unit 108 acquires user setting information for cloud print in MFP 100, as illustrated in FIG. 6, through data storage unit 105. Since the "printer ID" received by network communication unit 103 is "002", control unit 108 determines the priority to be "low". Also, control unit 108 determines the priority order of the target printer ID in relation to other printing (S202). Here, since the priority is "low", control unit 108 controls the printing to be performed by lowering the priority order thereof.

Network communication unit 103 communicates with cloud 200 using HTTP, uses the "print job acquisition" service on cloud 200 to transmit the "printer ID" and the print job identification information, and receives a file in a PDF format corresponding to the print data transmitted to cloud 200 by mobile 300 (S203).

Print unit 102 acquires the PDF file received by network communication unit 103 and executes printing (S204). Note that, here, another user may request display and operation unit 106 to execute a copy during printing by cloud print.

Next, control unit 108 determines whether or not another high-priority order print request is made (S205). More specifically, upon detection of a request for execution of copy or the like, control unit 108 determines the priority order of printing. Here, as described above, the priority of the printing in execution, i.e., the priority of the user setting information illustrated in FIG. 6 is "low". Thus, control unit 108 controls the printing to be performed by lowering the priority order thereof. Therefore, control unit 108 controls the printing by giving priority to copy or the like, and cancels the printing by cloud print (S206).

Next, printing of another high-priority order print request is executed and completed (S207). More specifically, after the cancellation described above, print unit 102 performs printing related to copy and the like.

Thereafter, the suspended print job from the cloud print service is reacquired and received (S208). More specifically, network communication unit 103 communicates with cloud 200 using HTTP after the completion of the printing such as copy, and uses the "print job acquisition" service in cloud 200 to retransmit the "printer ID" and the identification information on the print job of which printing has been canceled. Also, network communication unit 103 receives a PDF file corresponding to the print data transmitted to cloud 200 by mobile 300. Then, print unit 102 acquires the PDF file received by network communication unit 103, and resumes the printing (S204).

Then, since no other high-priority order print request is made here, the printing by cloud print requested by mobile 300 is performed to the end (S204, 5205, 5209 and S210).

Note that, in the above description, the user registers the user settings with cloud 200 from the user menu displayed by display and operation unit 106 in MFP 100. However, a registration unit for the administrator may be provided aside from the user menu. In other words, aside from the user menu, a unit configured to register user settings to cloud 200 may be provided in an administrator menu similar to that illustrated in FIG. 5 or in an administrator Web page. In this case, for an authorized user such as the administrator, even when user settings are registered in cloud 200 as the "high-speed printer" with the priority set to "high", no time limit may be provided without activating the timer. Furthermore, a user setting registration unit configured to register only the "high-speed printer" having the priority set to "high" to cloud 200 may be provided in the user menu and the administrator menu.

As described above, according to the first embodiment, when the user to perform cloud print is likely to be near the device, the terminal of the user is registered with the cloud for a certain limited time so that printing can be performed by raising the priority order. Thus, also when cloud print is used, it is possible to reduce situations where a print request from the user near the device has to wait due to a print request from a user who is not near the device.

Furthermore, by temporarily allowing the printing from the cloud, security improvement can also be expected. Moreover, when the user wishes to only temporarily perform printing with a target device, an effect of reducing the trouble of deleting the terminal settings from the cloud is also achieved.

In contrast, in the conventional system disclosed in the above-described Japanese Patent Application Publication No. 2003-256339, a user who wishes to perform printing by InternetFAX or cloud print can use the image formation device whether he/she is near or far away from the device. Therefore, the user is not necessarily near the image formation device. Meanwhile, the priority order of print requests is usually higher for the user near the image formation device than for those far away from the device. For this reason, in the conventional system, when it takes long to receive print data through the Internet such as cloud print and to perform subsequent printing, the user near a printer cannot immediately perform printing. In other words, in a case where it takes a long time to receive print data through the Internet and to perform subsequent printing, even when the user requesting the printing through the Internet is not near the printer, print requests from the user near the printer, such as copy and print from a PC, have to wait. This hinders printing requested by the user near the printer in the conventional system.

However, as described above, the first embodiment can reduce situations where a print request from the user near the device has to wait due to a print request from a user who is not near the device, even when the user near the device performs cloud print.

Second Embodiment

Figure 12:
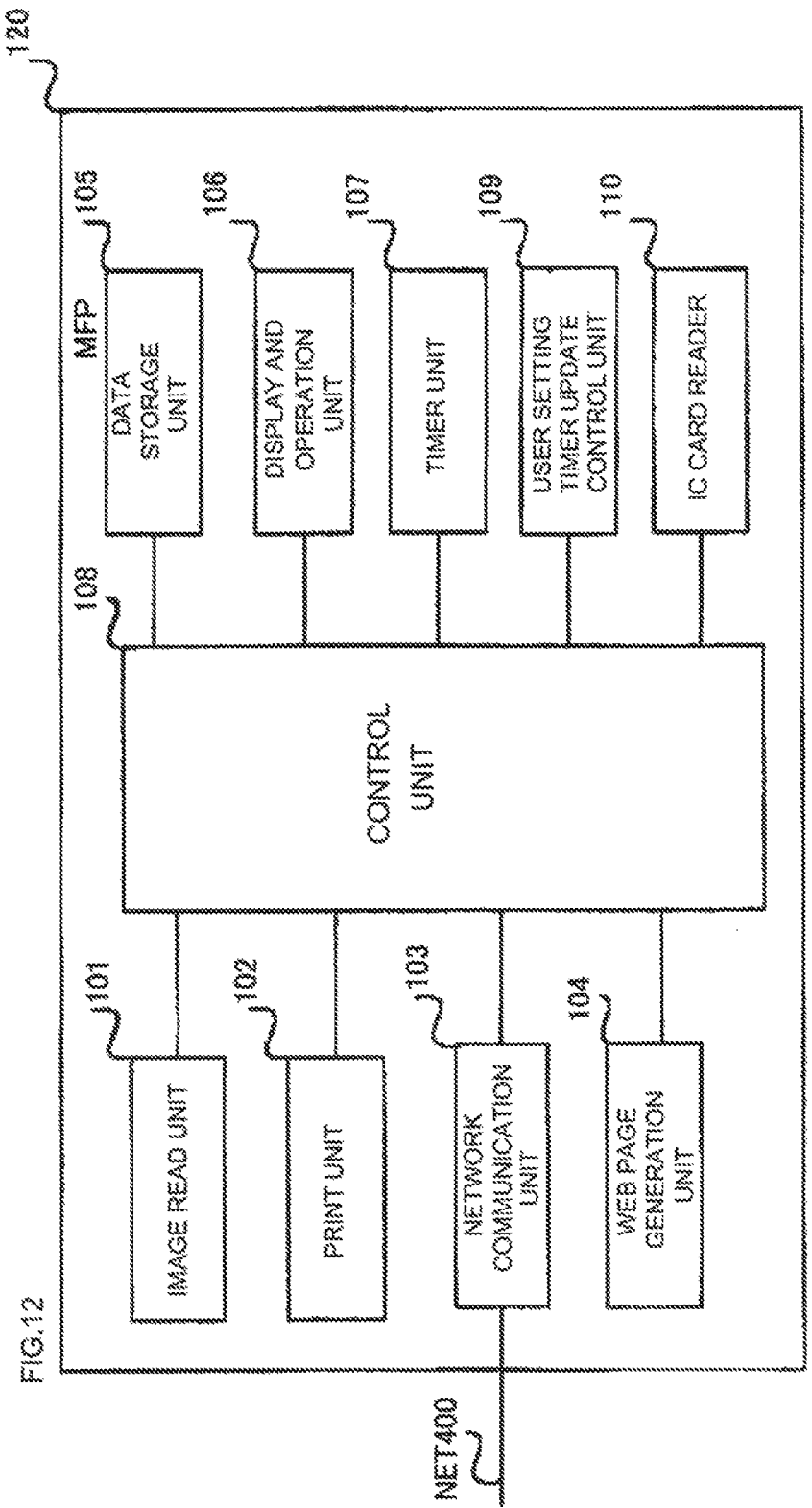
FIG. 12 is a block diagram illustrating a configuration of an MFP as an image formation device according to a second embodiment of the invention.

Next, a second embodiment of the invention is described. Also in this embodiment, a description is given of a case where the image formation device is an MFP as in the case of the first embodiment. FIG. 12 illustrates a configuration of MFP 120 as an image formation device used in the description of this embodiment. MFP 120 of this embodiment includes user setting timer update control unit 109 as a timer control unit and IC card reader 110, in addition to the configuration of MFP 100 according to the first embodiment described above. In other words, the respective units other than user setting timer update control unit 109 and IC card reader 110 are the same as those in MFP 100 according to the first embodiment illustrated in FIG. 1.

User setting timer update control unit 109 is a timer control unit configured to control the set time by controlling stop and reactivation of timer unit 107 which detects the lapse of the set time. When the user gives an instruction about the registration of the "high-speed printer" that is the first user setting, through display and operation unit 106, user setting timer update control unit 109 as the timer control unit controls timer unit 107 to extend the expiration of the set time. More specifically, user setting timer update control unit 109 controls, through control unit 108, the stop and reactivation of the timer in timer unit 107 to detect the expiration of the user settings registered mainly with the cloud print service, thereby controlling the time-out period of the user settings.

IC card reader 110 reads data stored in an IC card. This IC card reader 110 is a non-contact IC card reader provided in MFP 120, for example. A network configuration of this embodiment is the same as that of the first embodiment illustrated in FIG. 2. More specifically, as in the case of the first embodiment, MFP 120 and PC 500 are network-connected through NET 400 that is a LAN, and can communicate with each other using TCP/IP. Also, as in the case of the first embodiment, NET 400 is connected to the Internet, and MFP 120, cloud 200 and mobile 300 can communicate with each other using TCP/IP. Cloud 200 is a cloud print service providing the same cloud print function as that in the first embodiment. Mobile 300 is a mobile terminal such as a smartphone with an IC card function in addition to the same functions as those in the first embodiment. Note that mobile 300 can store account information for the cloud print service in an IC card, for example, as the IC card function. PC 500 is a personal computer or the like having the same functions as those in the first embodiment. In the above description, mobile 300 is directly connected to the Internet. However, the invention can also be realized with another network configuration in which mobile 300 is connected to the Internet through NET 400, as in the case of PC 500, using a wireless LAN.

Next, a description is given of an image formation method using MFP 120 having the configuration described above.

In this embodiment, operations are described taking, as an example, a case where MFP 120 performs "printer registration" with cloud 200 in order to allow MFP 120 to perform cloud print from mobile 300, and then expiration of the user setting after the "printer registration" by MFP 120 is extended. Here, as in the case of the first embodiment, the example is given of a user with a mobile 300 who comes on a business trip to a business office where MFP 120 is installed. The following description is given assuming a situation where the user performs printing from mobile 300 after registering his/her user setting of MFP 120 with cloud 200 so that he/she can use mobile 300 to perform printing with MFP 120, and keeps working the next day at the business office where MFP 120 is installed.

First, a description is given of an operation when MFP 120 performs "printer registration" with cloud 200 to register the user's user setting of MFP 120 with cloud 200.

The operation of registering the user's user setting of MFP 120 with cloud 200 is the same as that in the first embodiment. Thus, a description is given with reference to FIG. 4 illustrating the operation flow of MFP 100 performing "printer registration" with cloud 200 and FIG. 10 illustrating the flow of messages between the respective devices.

The user on a business trip specifies an account "mobile300@cloudprint.com" for the cloud print service in cloud 200 and a password for the account from the user menu as illustrated in FIG. 5 displayed by display and operation unit 106 in MFP 120, selects "ON" in cloud print preferred setting, and then requests execution of user setting registration with cloud 200 (S101). Here, the cloud print preferred setting is, as in the case of the first embodiment, the setting of a device specified by the user in order for MFP 120 to determine the priority that is the print priority order of cloud print in association with the user settings registered with the cloud print service.

Note that, as in the case of the first embodiment, the user acquires the account "mobile300@cloudprint.com" beforehand for the cloud print service through a Web page of cloud 200 or the like, and the password for the account is already set in cloud 200.

As in the case of the first embodiment, control unit 108 acquires information stored in the device, e.g., printing capacity information on MFP 120 through data storage unit 105, such as a paper size that can be designated (S102). Then, control unit 108 generates registration information for the cloud print service, including a printer name and the like, based on the information acquired from data storage unit 105 (S103). Note that, here, when the cloud print preferred setting that is the user input information acquired by display and operation unit 106 is "ON", control unit 108 generates two kinds of registration information: registration information for the cloud print service on "high-speed printer" as the printer name and registration information for the cloud print service on "low-speed printer". When the cloud print preferred setting is "OFF", control unit 108 generates only registration information for the cloud print service on "low-speed printer" as the printer name. In this embodiment, as in the case of the first embodiment, since the user sets the cloud print preferred setting to "ON", two kinds of registration information for the cloud print service are generated, including "high-speed printer" and "low-speed printer" as the printer name. Under the control of control unit 108, network communication unit 103 communicates with cloud 200 using HTTP through NET 400 and the Internet. By this communication, the user settings are registered in association with "mobile300@cloudprint.com" using the "printer registration" service in cloud 200 for each of the generated registration information for the cloud print service (S104). Here, the two kinds of registration information for the cloud print service are registered, respectively, including "high-speed printer" and "low-speed printer" as the printer name.

Thereafter, upon receipt of the result of the "printer registration" from cloud 200, network communication unit 103 acquires a "printer ID" to identify the registered user settings, for each of the registered user settings (S105). Here, for each of the user settings of "high-speed printer" and "low-speed printer" as the printer name, "001" or "002" is designated as the "printer ID" and returned by cloud 200.

As illustrated in FIG. 6, data storage unit 105 stores in the device the "printer ID" received from cloud 200 by network communication unit 103 and the user's account for the cloud print service acquired by display and operation unit 106. In addition, the priority is set to "high" for "high-speed printer" and "low" for "low-speed printer", and is also stored in the device (S106).

Control unit 108 determines whether or not the cloud print preferred setting acquired by display and operation unit 106 is set to "ON" (S107). When the cloud print preferred setting is "OFF", the processing is terminated. When the cloud print preferred setting is "ON", a timer (hereinafter referred to as the "expiration timer") in timer unit 107 to give notification of expiration after the elapse of a certain time-out period is activated as in the case of the first embodiment in order to detect the user setting in which the priority of "001" as the "printer ID" is set to "high", i.e., expiration of the user setting of "high-speed printer" as the printer name (S108). In this embodiment, the time-out period is 24 hours as in the case of the first embodiment.

Thereafter, as in the case of the first embodiment, the user uses mobile 300 to designate the user setting of MFP 120 for the "high-speed printer" as the printer name from the Web page of cloud 200.

Note that, in this embodiment, the business trip of the user is longer than 24 hours and the user keeps working the next day at the business office where MFP 120 is installed. Also, the user continues to perform the cloud print using MFP 120 through cloud 200.

Figure 13:
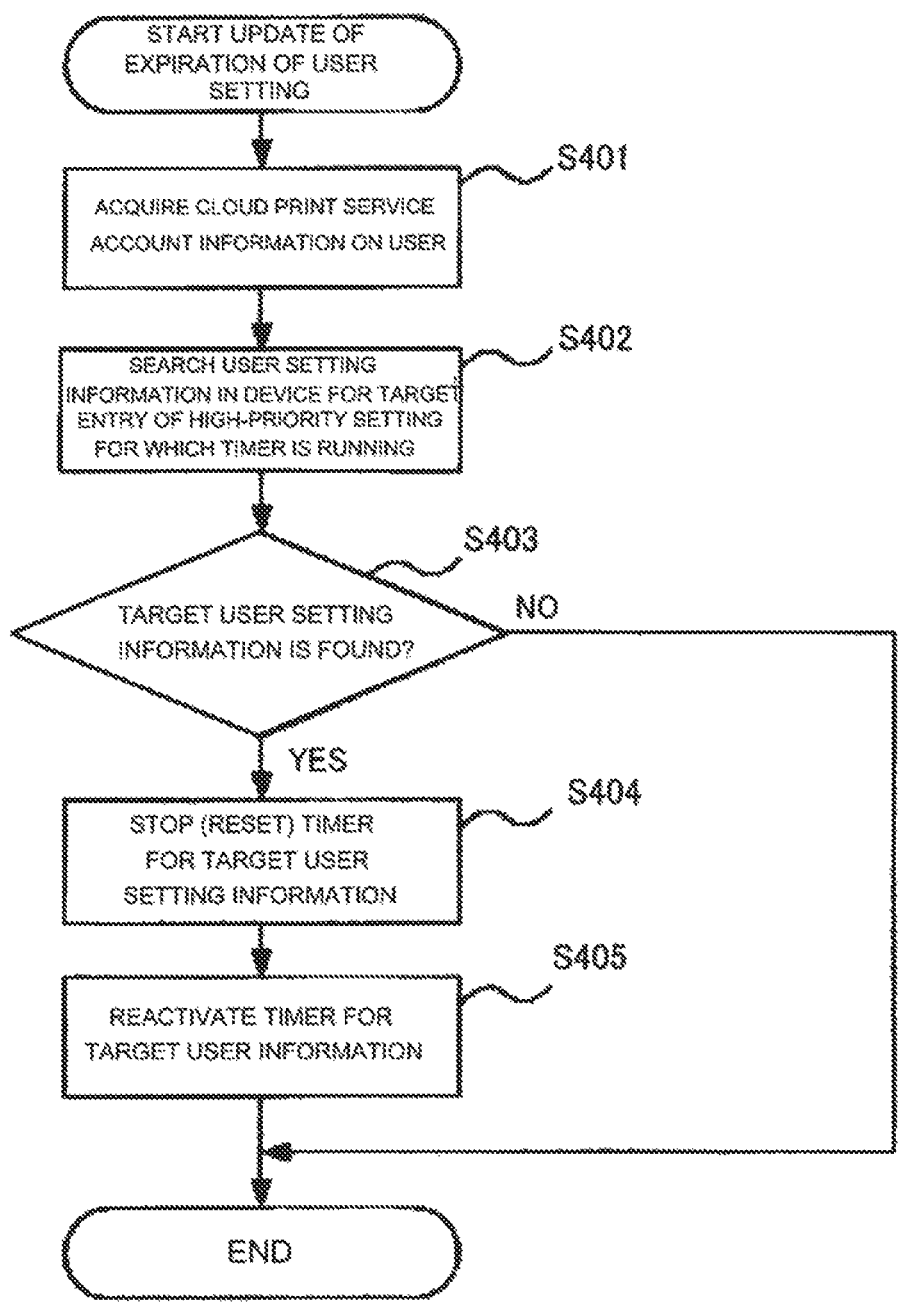
FIG. 13 is a flowchart illustrating processing performed by the MFP in updating an expiration timer for a user setting according to the second embodiment of the invention.

Next, with reference to FIG. 13, a description is given of an operation when the user goes to the business office where MFP 120 is installed the next day and operates MFP 120 to extend the expiration of the user setting of "high-speed printer" as the printer name before 24 hours pass after the user setting registration of MFP 120 with cloud 200. FIG. 13 is a flowchart illustrating the processing of MFP 120 in updating the expiration timer for the user setting.

Figure 14:
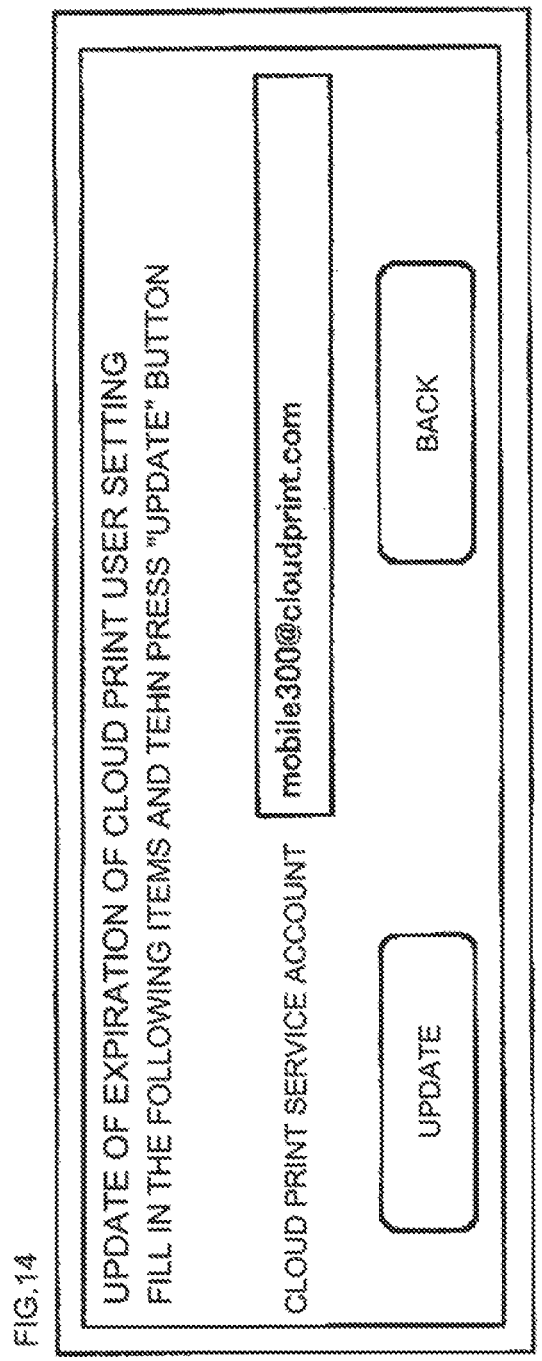
FIG. 14 is a diagram illustrating a screen example of a display and operation unit for updating the expiration of the user setting of the MFP according to the second embodiment of the invention.

The day after the business trip, the user instructs an update of the expiration from a user menu as illustrated in FIG. 14 displayed by display and operation unit 106 in MFP 120. More specifically, the user enters his/her account "mobile300@cloudprint.com" for the cloud print service in cloud 200, and then presses an "update" button to instruct an update of the expiration of the user settings for the account.

As illustrated in FIG. 13, control unit 108 acquires, through display and operation unit 106, the cloud print service account information inputted by the user (S401).

Next, control unit 108 searches the user setting information in the device for a target entry of high-priority setting for which the timer is running (S402). More specifically, control unit 108 searches the cloud print user setting information in MFP 120 as illustrated in FIG. 6, using data storage unit 105, for an entry for which the priority is set to "high" and the expiration timer is running for the cloud print service account of the user acquired by display and operation unit 106.

Next, control unit 108 determines whether or not the target user setting information is found (S403). In other words, control unit 108 determines whether or not there is an entry having "001" as the "printer ID". When it is determined that there is no entry having "001" as the "printer ID", the processing is terminated.

On the other hand, when having determined that there is the entry having "001" as the "printer ID", control unit 108 requests user setting timer update control unit 109 to control the expiration timer. Then, through timer unit 107, user setting timer update control unit 109 resets the expiration timer for "001" as the "printer ID", which is the timer for the target user setting information (S404).

Thereafter, the timer for the target user setting information is reactivated (S405). More specifically, in this embodiment, the time-out period that is 24 hours is reset, and the expiration timer to give notification of the expiration after the elapse of the time-out period of 24 hours is activated again.

Note that, in the above description, the user updates the expiration of the cloud print user setting for MFP 120 from the user menu displayed by display and operation unit 106 in MFP 120. However, the user may also use IC card reader 110 in MFP 120 to update the expiration. More specifically, the user allows control unit 108 in MFP 120 to read the account by passing mobile 300 as the IC card function over IC card reader 110 in MFP 120. Here, in mobile 300, the account "mobile300@cloudprint.com" for the cloud print service in cloud 200 is stored beforehand. Thus, control unit 108 in MFP 120 can acquire the cloud print service account "mobile300@cloudprint.com" using IC card reader 110, and can also execute the processing of updating the expiration of the user settings for the account.

In the above description, the expiration of the cloud print user settings in MFP 120 is updated by the user operating MFP 120. However, the expiration may be automatically extended based on a predetermined condition. To be more specific, under the control of user setting timer update control unit 109 in MFP 120, when print unit 102 performs printing for a predetermined number of times or more within a predetermined period of time, the expiration of the cloud print user settings may be automatically extended, determining that the user is likely to be near MFP 120. Here, the predetermined condition is the case where print unit 102 performs printing for a predetermined number of times or more within a predetermined period of time. The predetermined time is a preset time, which is set according to conditions such as print use frequency and the like when the user is near MFP 120. Also, the predetermined number of times is a preset number of times, which is set according to conditions such as print use frequency and the like when the user is near MFP 120.

Moreover, user setting timer update control unit 109 in MFP 120 may control the expiration timer to be temporarily stopped during a predetermined time period such as between 6 PM and 9 AM the following morning, for example. Here, the predetermined time period is a time period during which the user is not working, i.e., a time period from night to early morning, or the like.

As described above, according to the second embodiment, when the user to perform cloud print is likely to be near the device, the expiration of the user's user settings registered with the cloud can be extended. Accordingly, the user no longer needs to re-register the user settings to the cloud. Thus, also when using cloud print, it is possible not only to reduce a situation where a print request from the user near the device has to wait due to a print request from a user who is not near the device, but also to improve the convenience for users who wish to continuously use the cloud print near the device.

[Utilization Form]

In the respective embodiments described above, MFPs 100 and 120 are used as the image formation device. However, needless to say, other printers, multifunction machines, copying machines and the like may be used.

Note that the aspects of the invention are not limited to the embodiments described above but also include various modifications that can be made by those skilled in the art, and the effects of the invention are not limited to those described above. More specifically, various additions, modifications, combinations, partial deletions and the like can be made without departing from the conceptual thought and spirit of the invention derived from the contents and their equivalents defined in claims.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation device comprising:
    a communication unit configured to be connected to an external device through a network and to receive image data from the external device;
    a control unit configured to set a priority order for the image data received from the external device by the communication unit;
    a print unit configured to print the image data from the external device and image data requested to be printed from within a local area of the image formation device, based on the priority order; and
    a timer unit configured to be activated when the priority order is set and to detect an elapse of a set time, wherein the control unit lowers the priority order after the elapse of the set time detected by the timer unit.

2. The image formation device according to claim 1, wherein
    the control unit is connected through the communication unit to a registration unit in the external device, the registration unit being capable of registering a first user setting that is a high-priority setting and a second user setting that is a low-priority setting, and the control unit includes a processing function to lower the priority order by deleting the first user setting from the registration unit in the external device after the elapse of the set time.

3. The image formation device according to claim 1, further comprising:
    a timer control unit configured to control the set time by controlling stop or reactivation of the timer unit detecting the elapse of the set time.

4. The image formation device according to claim 3, further comprising:
    an operation unit configured to receive an operation request from a user, wherein when the user gives an instruction related to registration of the first user setting through the operation unit, the timer control unit extends expiration of the set time by controlling the timer unit.

5. The image formation device according to claim 3, wherein when printing by a registration of the first user setting is performed for a preset number of times or more within a preset period of time, the timer control unit extends the expiration of the set time by controlling the timer unit.

6. The image formation device according to claim 3, wherein the timer control unit suspends the timer unit for a predetermined period of time.

7. An image formation system comprising:

a cloud device configured to transmit and receive image data through a network and provide a service to print the received image data; and the image formation device according to claim 1 configured to print image data received from the cloud device.

8. An image formation method of forming images based on image data, comprising:

receiving image data from an external device by a communication unit connected to the external device through a network;

setting a priority order, by a control unit, for the image data received from the external device by the communication unit;

printing, by a print unit, the image data from the external device and image data requested to be printed from within a local area of an image formation device, based on the priority order;

detecting an elapse of a set time by a timer unit activated when the priority order is set; and lowering the priority order after the elapse of the set time detected by the timer unit.

9. The image formation method according to claim 8, further comprising:

lowering the priority order by deleting a first user setting from a registration unit in the external device after the elapse of the set time, the registration unit being capable of registering the first user setting that is a high-priority setting and a second user setting that is a low-priority setting.

10. The image formation method according to claim 8, further comprising:

controlling, by a timer control unit, the set time by controlling a stop or a reactivation of the timer unit configured to detect the elapse of the set time.

11. The image formation method according to claim 10, wherein when a user gives an instruction related to a registration of the first user setting through an operation unit, the timer control unit extends an expiration of the set time by controlling the timer unit.

12. The image formation method according to claim 10, wherein when printing by a registration of the first user setting is performed for a preset number of times or more within a preset period of time, the timer control unit extends the expiration of the set time by controlling the timer unit.

13. The image formation method according to claim 10, wherein the timer control unit suspends the timer unit for a predetermined period of time.

* * * * *